US009891835B2

(12) United States Patent
Patel et al.

(10) Patent No.: US 9,891,835 B2
(45) Date of Patent: *Feb. 13, 2018

(54) LIVE CONFIGURABLE STORAGE

(71) Applicant: MICROSOFT TECHNOLOGY LICENSING, LLC, Redmond, WA (US)

(72) Inventors: Sachin Chiman Patel, Bellevue, WA (US); Shiv Rajpal, Sammamish, WA (US); Karan Mehra, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,792

(22) Filed: Jan. 30, 2017

(65) Prior Publication Data

US 2017/0235498 A1    Aug. 17, 2017

Related U.S. Application Data

(63) Continuation of application No. 14/645,085, filed on Mar. 11, 2015, now Pat. No. 9,600,181.

(51) Int. Cl.
*G06F 12/00* (2006.01)
*G06F 3/06* (2006.01)

(52) U.S. Cl.
CPC ............ *G06F 3/0608* (2013.01); *G06F 3/061* (2013.01); *G06F 3/065* (2013.01); *G06F 3/0619* (2013.01); *G06F 3/0631* (2013.01); *G06F 3/0685* (2013.01)

(58) Field of Classification Search
CPC ...... G06F 3/0608; G06F 3/061; G06F 3/0619; G06F 3/0631; G06F 3/065; G06F 3/0685
See application file for complete search history.

(56) References Cited

U.S. PATENT DOCUMENTS 5,574,851 A    11/1996  Rathunde
6,052,759 A    4/2000   Stallmo et al.
(Continued)

FOREIGN PATENT DOCUMENTS

EP    1564634 A2    8/2005
EP    2645260 A2    10/2013
(Continued)

OTHER PUBLICATIONS

Second Written Opinion issued in PCT Application No. PCT/US2016/019356, dated Jan. 26, 2017.
(Continued)

*Primary Examiner* — Larry T Mackall
(74) *Attorney, Agent, or Firm* — Workman Nydegger

(57) ABSTRACT

A system for storing data in a dynamic fashion. The system includes a storage entity. The storage entity includes portions of a plurality of different persistent storage devices. Each storage device has a set of constraints. The storage entity is configured to store data in a dynamic fashion in a layout on the persistent storage devices of the storage entity that meets the different data requirements for the data while still being within the constraints for the persistent storage devices. The storage entity is configured to change the layout for a portion of the data as requirements related to at least one of performance or resiliency for a portion of the data change while the storage entity continues to provide the data from the storage entity.

21 Claims, 4 Drawing Sheets

(56) References Cited

U.S. PATENT DOCUMENTS

| | | |
|---|---|---|
| 7,979,616 B2 | 7/2011 | Bravo et al. |
| 8,321,645 B2 | 11/2012 | Rabii et al. |
| 8,843,459 B1 | 9/2014 | Aston et al. |
| 2005/0086429 A1 | 4/2005 | Chatterjee et al. |
| 2006/0206662 A1 | 9/2006 | Ludwig |
| 2008/0109647 A1 | 5/2008 | Gavens et al. |
| 2009/0106255 A1 | 4/2009 | Lacapra et al. |
| 2012/0137066 A1 | 5/2012 | Nolterieke et al. |
| 2012/0198152 A1 | 8/2012 | Terry et al. |
| 2012/0331206 A1 | 12/2012 | Flynn et al. |

FOREIGN PATENT DOCUMENTS

| | | |
|---|---|---|
| EP | 2302500 A1 | 11/2013 |
| WO | 2013176308 A1 | 11/2013 |

OTHER PUBLICATIONS

Office Action dated Apr. 22, 2016 issued in U.S. Appl. No. 14/645,085.

Yan Liu, et al. "Ess: A New Storage Architecture for Mid/Large Raid", Proceedings of 2005 International Conference on Machine Learning and Cybernetics, Aug. 2005, pp. 940-947.

International Search Report and Written Opinion issued in PCT Application No. PCT/US2016/019356, dated May 3, 2016, 15 pages.

Notice of Allowance dated Nov. 18, 2016 issued in U.S. Appl. No. 14/645,085.

International Preliminary Report on Patentability issued in PCT Patent Application No. PCT/US2016/019356 dated May 31, 2017.

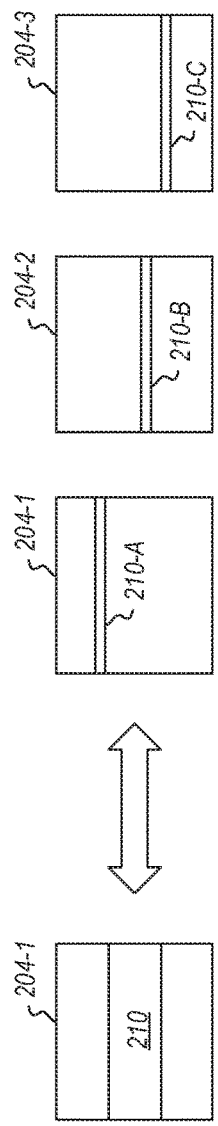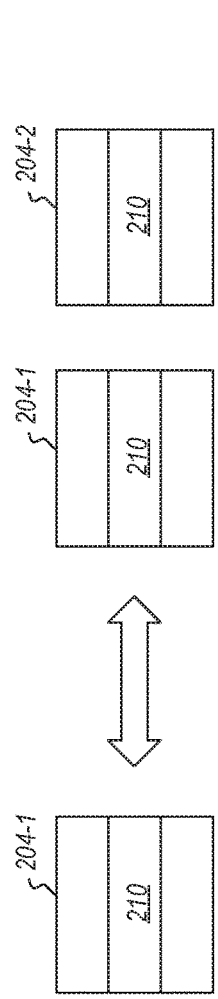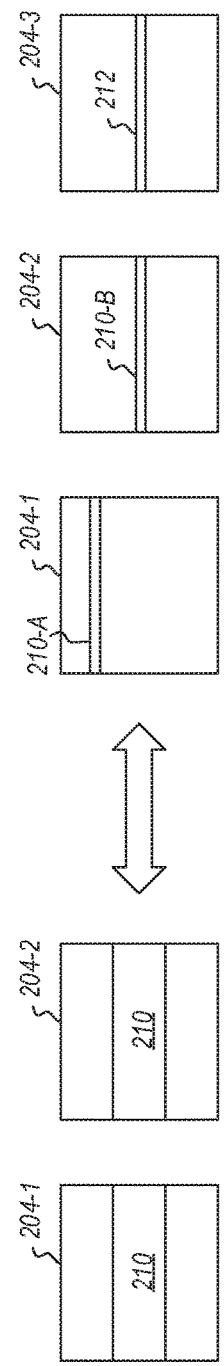

LIVE CONFIGURABLE STORAGE

CROSS-REFERENCE TO RELATED APPLICATIONS

This application is a continuation of U.S. patent application Ser. No. 14/645,085 filed on Mar. 11, 2015, entitled "Live Configurable Storage," and which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Computer systems often have some type of non-volatile data storage. For example, computer systems may have one or more hard drives, solid state drives, tape drives, etc. This non-volatile data storage can have a number of different constraints and be arranged in a number of different fashions. For example, storage devices may have various access speeds, sizes, etc. When multiple devices are used, they can be arranged in various ways to provide certain levels of performance and/or resiliency. For example, if it is desirable for a system to have fast access to storage, the system may have solid states drives installed on the system and/or may stripe the data on multiple devices to allow for quick data access. Different levels of resiliency can be achieved by different mirroring or parity schemes. For example, a moderate level of resiliency can be achieved by a mirroring scheme that maintains two copies of data, where the different copies are on one or more different device arrangements. Even more redundancy can be achieved by having three copies of data on three different device arrangements. The first example can tolerate a single device failure while the second example could tolerate two device failures. Alternatively, various parity schemes, such as RAID5 or RAID6, could be used to obtain resiliency. Parity schemes use less disk space than mirroring schemes, but have lower levels of performance because of the need to perform various computations to create the parity.

When a system designer designs storage for a system, they will typically determine general requirements for the data in the system and configure a storage entity (where an entity can be portions of one or more storage devices arranged to appear as a particular data silo, such as a volume, to the system) accordingly. However, once a storage entity is configured for the system, that storage entity is fixed in its constraints. For example, if so configured, a storage entity will always be simple storage with a fixed capacity, mirrored storage with a certain number of copies, or parity storage with a certain resiliency.

However, data may have certain handling requirements that change over time, or different data introduced into the system may have different handling requirements. In particular, data may have certain performance and/or resiliency requirements. Performance requirements are related to how quickly data can be accessed whereas resiliency requirements are related to the ability to maintain data availability in the context of hardware failures or other data access or data loss.

Presently, system designers may have several different storage entities configured to meet different data requirements for data. However, if data requirements change for data, or if new data is introduced into the system having data requirements that differ drastically from that provided by available storage entities, the system designer may need to design and add new storage entities and/or make inefficient use of existing storage entities, such as by storing data in an entity that far exceeds the requirements for the data.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for storing data in a dynamic fashion where data is stored on a live persistent storage entity. The entity is comprised of portions of a plurality of different persistent storage devices. Each of the storage devices has certain storage constraints. The data is stored in a manner that meets requirements for the data while remaining within the constraints for the storage devices. The method includes identifying requirements for data. The requirements comprise requirements with respect to at least one of performance or resiliency. The method further includes identifying constraints of the persistent storage devices in the persistent storage entity. The method further includes storing the data in a dynamic fashion in a layout on the persistent storage entity that meets the requirements for the data while still being within the constraints for the persistent storage devices, such that the layout for the data can change as requirements for the data change or as other data is operated on in the persistent storage entity.

Another embodiment includes a system for storing data in a dynamic fashion. The system includes a storage entity. The storage entity includes portions of a plurality of different persistent storage devices. Each storage device has a set of constraints. The storage entity is configured to store data in a dynamic fashion in a layout on the persistent storage devices of the storage entity that meets requirements for the data while still being within the constraints for the persistent storage devices. The storage entity is configured to change the layout for the data as requirements related to at least one of performance or resiliency for the data change while the storage entity continues to provide the data from the storage entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2A illustrates a transition from simple storage to striped storage;

FIG. 2B illustrates a transition from simple storage to mirrored storage;

FIG. 2C illustrates a transition from mirrored storage to parity storage;

DETAILED DESCRIPTION

Some embodiments illustrated herein implement a dynamically configurable storage entity. This has the effect that a single storage entity may exhibit multiple different performance and resiliency characteristics at the same time for different data having different requirements. In a further example, a single volume may be able to store data in different ways with respect to performance and resiliency.

Some embodiments can dynamically configure storage even after initial configuration, while the storage entity is live (where live means that the storage entity is storing and providing data). The dynamic configuration allows for changing the way data is stored over time. Thus, performance and resiliency characteristics can be changed over time on the storage entity as data requirements change and/or as new data is introduced into the storage entity. Thus, a storage entity may have changing performance, resiliency, and size characteristics over time as different storage requirements are needed for the same or new data.

Figure 1:
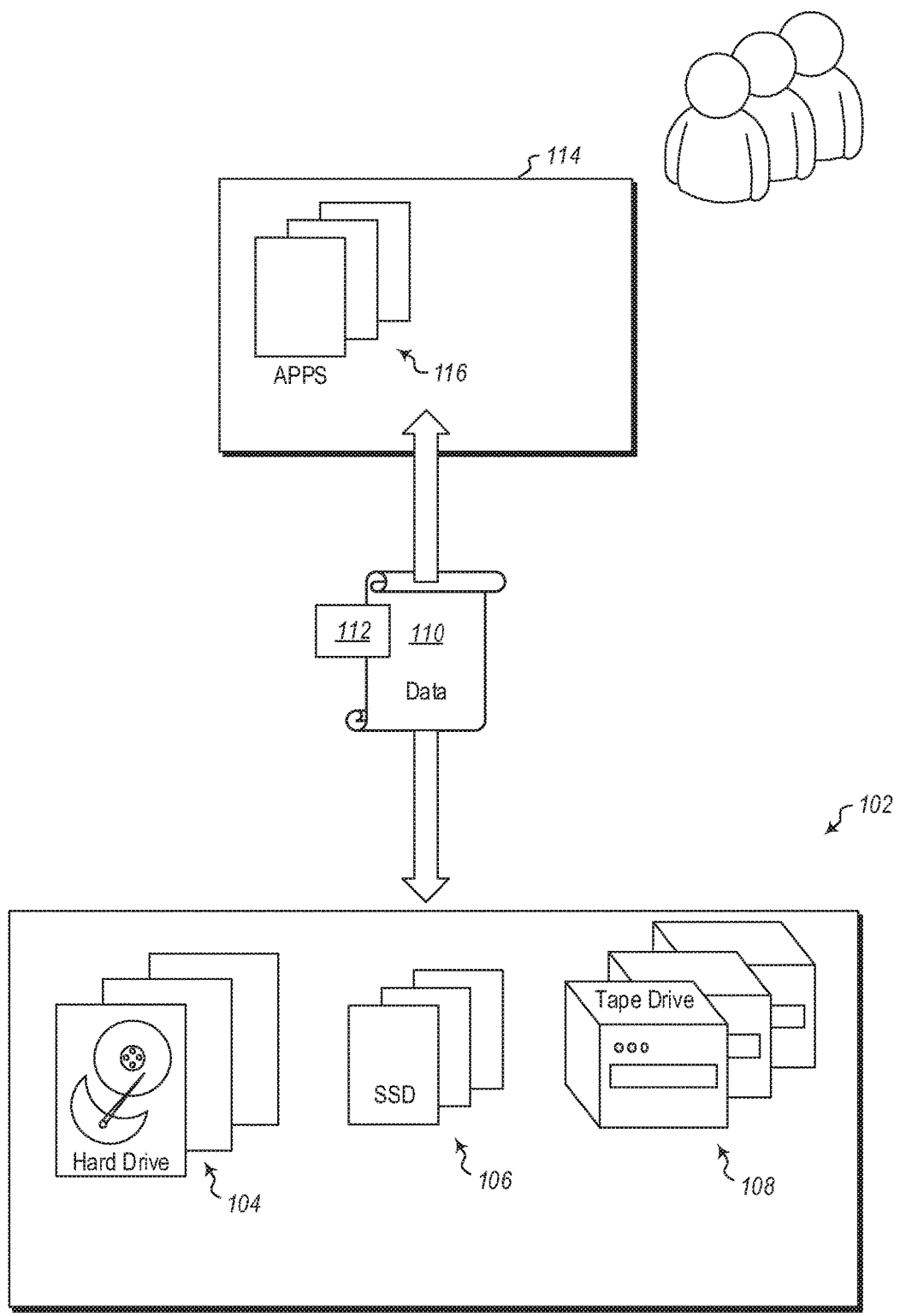
FIG. 1 illustrates a storage entity with various hardware devices that can be dynamically arranged to meet requirements for data.

Referring now the FIG. 1, an example is illustrated. FIG. 1 illustrates a storage entity 102. The storage entity 102 includes a variety of different hardware devices. For example, the storage entity 102 includes a plurality 104 of hard disk drives, a plurality 106 of solid state drives, and a plurality 108 of tape drives.

The storage entity 102 can have the various different hardware devices dynamically configured to achieve certain storage characteristics and to change those characteristics over time. For example, multiple hardware devices may be used for mirroring or parity schemes to create redundancy. Alternatively, multiple devices may be used for striping schemes (such as RAID 0) for better performance when accessing data on the storage entity 102. Notably, different portions of the same hardware device can be used for different schemes. Thus for example, a given hard drive may have different portions of the hard drive used for different schemes. One portion of the hard drive may be used in implementing a mirroring scheme. A different portion of the hard drive may be used when implementing the parity scheme. A yet even different portion of the hard drive may be used to implement the simple storage scheme with no mirroring (such as RAID 1), parity (such as RAID 5), or striping (such as RAID 0). As data requirements change, or as new data is received with new requirements, the various hardware devices can be reconfigured to meet the requirements of the data.

Embodiments may implement systems and methods for storing data in a dynamic fashion. The data may be stored on a live persistent storage entity. The live persistent storage entity is comprised of portions of a plurality of different persistent storage devices. Each persistent storage device has certain, and often differing, storage constraints. Such constraints could be capacity, media type, speed, external cache availability and size, data density, etc. Typically, these constraints contribute to three fundamental characteristics which are data capacity, performance (i.e. speed at which data can be read or written), and resiliency. Constraints of individual storage devices can be utilized in various ways to meet requirements for data.

FIG. 1 illustrates data 110 that is received by the storage entity 102. The data 110 has certain requirements 112 associated with it. For example, the requirements may specify that the data must be stored in a way that has certain performance and/or resiliency requirements. Embodiments can therefore identify requirements for data. As noted, the requirements may include requirements with respect to at least one of performance or resiliency. For example, with respect to performance, a data requirement may specify that data must be able to be accessed within a certain amount of time. These requirements may be met, for example, by using hardware devices having certain access speeds and/or by using various data striping techniques across multiple hardware devices to achieve better performance.

With respect to resiliency, requirements may specify that data must have a certain level of redundancy and/or that data is safe from loss to within some specified statistical figure. Resiliency requirements may be met by using hardware devices employing media with a certain amount of resiliency, by using multiple hardware devices in one or more mirroring schemes to obtain a certain amount of resiliency, by using multiple hardware devices in one or more parity schemes to obtain a certain amount of resiliency, etc.

Notably, certain techniques for obtaining better performance may affect resiliency, and vice versa. Thus, embodiments may balance how the various hardware devices with certain constraints are used to meet requirements for data. Thus, embodiments may identify constraints of the persistent storage devices in a persistent storage entity and store the data in dynamic fashion in a layout on the persistent storage entity that meets the requirements for the data while still being within the constraints for the persistent storage devices. This is done in a fashion such that the layout for the data can change as requirements for the data change or as other data is operated on in the persistent storage entity.

Notably, requirements 112 for data 110 can be determined in one or more of a number of different fashions. For example, requirements may be associated directly with the data 110 using external metadata that can be defined by a user or application.

In another example, requirements 112 for the data 110 may be determined and specified based on applications that create or operate on the data 110. Thus, for example, FIG. 1 illustrates a system 114 which includes a plurality of applications 116. Each of the applications in the plurality of applications 116 may have distinct requirements for some or all of the data used by those applications. For example, a browser application may need data to be accessed quickly, but may not be concerned with resiliency as the data can simple be re-downloaded from the source. Alternatively, a finance application may require data to be stored in a very resilient fashion. In yet another example, an e-commerce application may require that data is stored in way that has both high performance and high resiliency. Thus, in some embodiments, the requirements for data may be determined based on an application reading or writing the data.

Data requirements, in alternative or additional embodiments, may be determined based on users of data. For example, an officer of a company may have both high performance and high resiliency requirements for data, while a mail-room employee may have lower performance and/or or resiliency requirements. In a generalized example, data requirements may be based on the role of a user. In a similar example, data requirements may be based on the department in an enterprise that reads or writes the data 110. Thus, for example, data generated or accessed by an accounting department may have different requirements than data generated or accessed by the human resources department.

Data requirements, in alternative or additional embodiments, may be determined based on the heat of data or access patterns for data. Heat of data generally refers to when data was/is accessed. For example, data that was accessed more recently is warmer than data that was accessed less recently. Hot data may have higher performance requirements than data that is less hot.

Various other factors may be used alone or in combination with each other or other factors to determine data requirements. Such other factors may include one or more of service agreements, time of day (or other temporal factor), network characteristics for networks carrying data, protocols used to interact with data, etc.

As noted above, data is stored in a dynamic fashion in a layout on the persistent storage entity that meets the requirements for the data while still being within the constraints for the persistent storage devices. This is done in a manner such that the layout for the data can change as requirements for the data change or as other data is operated on in the persistent storage entity. Thus, for example, requirements for certain data can change. As the requirements change, the layout can change and hardware devices for a storage entity can be rearranged for efficient use. Various examples are now illustrated.

FIGS. 2A-2C illustrate various examples of dynamically changing the layout for data in a persistent storage entity.

FIG. 2A illustrates that the layout can be changed to/from a simple data layout from/to a striped data layout. In particular, in the example illustrated in FIG. 2A, data 210 is stored in a simple format on a hard disk drive 204-1. Data requirements for the data 210 may change requiring that the data 210 be stored in a more performant way. This can be accomplished, for example, by striping the data 210 across multiple hard disk drives. Thus, in the illustrated example, a portion 210-A of the existing data 210 is left on the hard disk drive (HDD) 204-1. A portion 210-B of the data 210 is copied to the hard disk drive 204-2, and a portion 210-C of the data 210 is copied to the hard disk drive 204-3. This allows the data 210 to be accessed more quickly, as is well known for data striping data storage schemes. This also frees up some space on the hard disk drive 204-1 as the portions 210-B and 210-C no longer need to be stored on the hard disk drive 204-1. Thus, the layout can be changed dynamically on a live storage entity while portions of the data can continue to be stored and provided (e.g. data portion 210-A). Portions of the data (i.e. portion 210-A) on the HDD 204-1 can be repurposed when moving from a simple layout to a striped layout. Notably, this process can be reversed if some data requirement is relaxed, or some other data requirement can be achieved by having all of the data 210 stored in a simple layout.

FIG. 2B illustrates another example where a data layout may be changed to/from a simple layout from/to a mirrored layout. In particular, FIG. 2B illustrates data 210 stored in a simple layout on a hard disk drive 204-1. Data requirements for the data 210 may change and may specify that the data 210 now needs a higher level of resiliency. The system may determine that this can be accomplished (while still maintaining a required level of performance) by mirroring the data onto another hard disk drive 204-2. Thus, the first existing copy of the data 210 will remain in place on the hard disk drive 204-1, while a new copy of the data 210 will be added to the hard disk drive 204-2. As illustrated, this can be done while an overall storage entity including the hard disk drive 204-1 is live and providing read/write capabilities on the data 210. In fact, the data on the hard disk drive 204-1 can be repurposed from the simple layout to the mirrored layout such that efficiencies can be obtained with respect to creating the mirrored layout. As with the example above, this process can be performed in the reverse if it is determined that the resiliency requirement has been relaxed. In this case, the second copy of the data 210 (or alternatively the first copy of the data 210 on the HDD 204-1) can be deleted or invalidated, freeing up hard disk drive space for use in other data storage.

FIG. 2C illustrates an example of changing from a mirrored layout of data 210 on HDDs 204-1 and 204-2 to a parity layout across drives 204-1, 204-2, and 204-3. In the illustrated parity layout, data is striped across multiple drives, such that a portion 210-A of the data 210 is on the first HDD 204-1 and a portion 210-B of the data is on the second HDD 204-2. In this configuration, read access is performant because of the striping across multiple drives. In addition to the striped data, parity data is created by performing some operation, such as a logical XOR, on the data. This parity data is stored on HDD 204-3 as illustrated by the parity data portion 212. Changing from a mirrored layout to a parity layout can be accomplished efficiently by retaining the portion 210-A on the first drive 204-1, the portion 210-B on the second drive 204-2, and creating the portion 210-C on the third drive 204-3. Note that the parity layout may be slower, especially for writes in terms of performance.

Note that while in the examples illustrated in FIGS. 2A-2C, a single layout type of data storage is illustrated, it should be appreciated that embodiments can be implemented where several different layout types can be implemented on a single hardware device. Thus, for example, the same HDD may be used to implement simple storage for some data, while also being used in a striped storage layout for other data, while also being used in a mirrored data layout for still other data.

Figure 3:
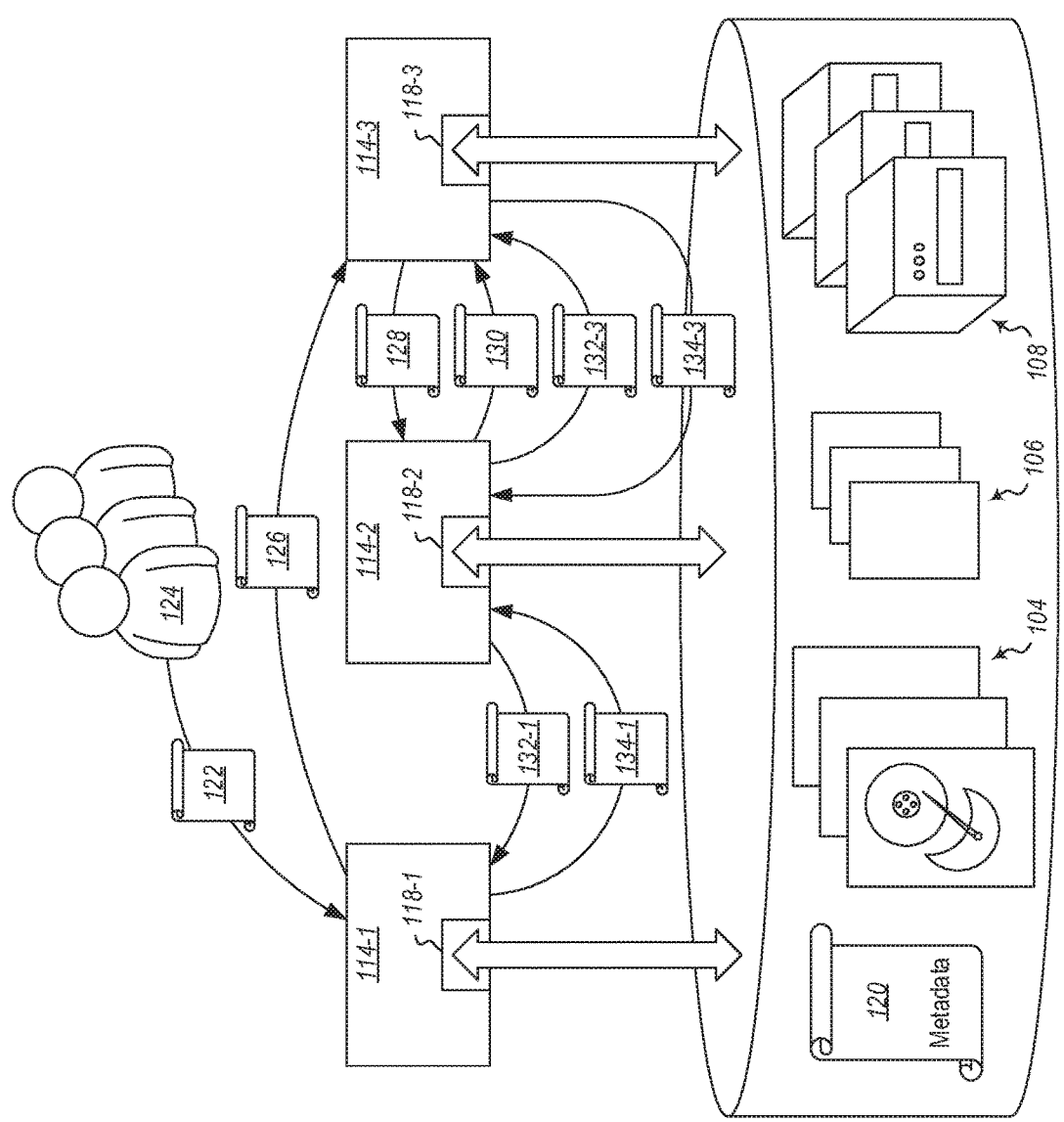
FIG. 3 illustrates a storage entity implemented in a cluster environment.

Referring now to FIG. 3, embodiments may be implemented in cluster environment. In such environments, a backing store, such as the storage devices 102 may be used as the backing store for storage entities 118-1, 118-2, and 118-3 for systems 114-1, 114-2 and 114-3 respectively. In this example, each of the storage entities are set apart for use by the corresponding system, but all of the storage entities are backed and implemented physically by the storage devices 102. Therefore, all of the systems 114-1 through 114-3 need to be correlated to ensure that one system will not interfere with another system's use of the storage devices 102. This can be particularly true as one storage entity needs to be expanded, which potentially requires changes in another storage entity to accommodate the expansion.

One way of accomplishing this might be to pass all accesses of the storage devices through one of the systems to ensure that all changes to the storage devices 102 do not interfere with existing uses of the storage devices 102. However, this would create a bottleneck, namely, the capacity (e.g. processor capacity, memory capacity, network bandwidth capacity, etc.) of the system through which all access to the storage devices was routed would be the bottleneck for all access to the storage devices 102.

To mitigate this, some embodiments use a system of communication between systems to correlate allocation of storage on the storage devices 102 through a single system, but distribute the operations on the storage devices 102 across the systems. In particular, in the example illustrated, each of the systems 114-1, 114-2 and 114-3 are responsible for a given storage entity 118-1, 118-2, and 118-3 respectively. Any access to a given storage entity is routed through the corresponding system. One of the systems is responsible for metadata 120 for the storage devices 102. The system that is responsible for the metadata 120 may be one of the systems responsible for a storage entity or some other system. This system may be considered to be the owner of the metadata 120. In the illustrated example, it will be assumed, for illustration purposes, that system 114-2 is responsible for the metadata 120.

A system responsible for a given storage entity (i.e. the owner of the storage entity) will correlate with the system (i.e. system 114-2) responsible for the metadata when attempting to perform operations on the storage devices 102 on behalf of the storage entity. Various messages can be sent between the systems to correlate usage of the storage devices 102. For example, a message 122 may be sent from a user 124 to a system (e.g. system 114-1 or any other system convenient to the user 124) to request access (such as read or write access) to a storage entity (e.g. storage entity 118-3). A message 126 may be sent between system 114-1 and 114-3 to route the user request to the system 114-3 responsible for the storage entity 118-3. A message 128 may be sent from the system responsible for the storage entity (e.g. system 114-3) to the system (114-2) responsible for correlating the metadata 120 to determine if the requested access can be performed.

The system 114-2 can examine the storage devices 102 to determine if the storage devices have capacity to accommodate the requirements for data which is the subject of the access request message 122. For example, the requested data access may require allocating some storage that meets certain performance and resiliency requirements. The system 114-2 can consult the metadata 120 to determine if there are portions of storage devices available to meet these requirements. If there is available storage in the storage devices 102 that meets these requirements, the system 114-2 can allocate the storage to the storage entity 118-3 in the metadata 120 and simply send a message 130 back to the system 114-3 indicating that storage is available (along with details about how to access the storage) for the system 114-3. The system 114-3 then knows that the storage entity 118-3 has been adjusted to accommodate the access requested in the access request message 122. The system 114-3 can then simply perform the access requested on the storage entity 118-3 and therefore, the backing store, storage devices 102.

However, in other scenarios, there may not be sufficient storage resources in the storage devices 102 to accommodate the access requested in the access request message 122. In this case, the owner system, system 114-2 can attempt various actions to create or free-up storage resources.

In a first example, the owner system 114-2 may attempt to identify storage resources that are not needed by any of the storage entities 118-1, 118-2 and/or 118-3 that could be voluntarily surrendered. To accomplish this, the owner system 114-2 sends messages 132-1 and 132-3 to the systems 114-1 and 144-3 respectively. Those systems could identify resources that could be voluntarily surrendered without effecting important data. For example, those systems may identify temporary file storage, data marked for deletion, outdated back-up files, outdated report or log files, etc. Those systems could then send messages 134-1 and 134-3 indicating the resources that are voluntarily being surrendered. The owner system 114-2 could also identify any resources it could surrender. The owner system 114-2 could then update the metadata 120 and inform the system 114-3 what resources had been allocated so that the system 114-3 could service the access requested in the access request message 122.

In an alternate example, the messages 132-1 and 132-3 are sent, the systems 114-1 and 114-3 (as well as the system 114-2) may not identify any resources that they are willing to voluntarily surrender. In this case, the owner system 114-2 may have to forcefully move certain data. The owner system 114-2 can identify appropriate requirements for data in the storage entity. So long as the owner system can move data to a device configuration within the storage entity that meets the requirements for the data, resources can be freed up to accommodate the access request of the access request message 122. The metadata 120 can be updated to reflect the data movement, and the system 114-3 can be informed by the owner system 114-2 that resources are available at the storage devices 102 to accommodate changes to the storage entity 118-3 to accommodate the access request specified in the access request message 122.

Returning now once again to concepts that may be implanted in various types of systems, the following illustrates specific examples implemented within the context of storage tiering. Storage tiering allows for portions of storage devices of different media types to be combined into a single storage entity. Each different data requirement corresponds to a storage tier. For example, SSDs (Solid State Drive) can be used for faster performance, while HDDs (Hard Disk Drive) can be used for slower performance, but may have more capacity. SSDs are more expensive than HDDs, so the performance comes at a cost. The file system will allocate the location of files and metadata on each storage tier to optimize for performance, choosing to put more performance sensitive data on the SSD.

In some current systems, such as Windows 8.1 and Server 2012 available from Microsoft Corporation of Redmond Wash., each storage tier must have the same resiliency settings as other storage tiers in a storage entity. This means that the minimum number of storage devices must match between the SSD and HDD tier, which leads to a higher cost. However, by allowing for different resiliency settings for each tier, cost can be reduced. The different resiliency settings could be directed to resiliency type (simple, mirror, parity), number of columns (i.e. the minimum number of storage devices in a tier), storage device failure tolerance, etc.

Thus, in the illustrated examples below, storage tiers can have different resiliency settings, such as resiliency type, number of columns, and storage device failure tolerance.

This can be used to facilitate lower cost deployments by not over provisioning a storage entity to meet data storage requirements.

In current systems, storage tiers are supported to optimize data placement between SSDs, and HDDs. However, there are currently a number of constraints: (a) the resiliency type must be the same between tiers (e.g. mirror, parity); (b) the number of columns must be the same between tiers (i.e. the same number of disks must be used); (c) the number of copies must be the same between tiers; and (d) only fixed provisioning is supported (meaning that once the system is provisioned, it cannot be changed.

However, by implementing a dynamic storage system, one or more features may be realized. For example, embodiments could define additional media types for tiering. Such media types could be Non-Volatile Dual Inline Memory Module (NVDIMM) (which is RAM that retains data even if power is lost), cloud storage, or other storage. With dynamic storage, embodiments could support tiers with different resiliency types. For example, the SSD tier could use mirror, while the HDD tier could use parity. With dynamic storage, embodiments could support tiers with different column counts. As such, each tier is bound only by the minimum column count for the associated resiliency type. With dynamic storage, embodiments could support tiers with different storage device failure tolerance. For example, the SSD tier could use 2-way mirror, while the HDD tier could use dual parity. With dynamic storage, embodiments could support tiers with different resiliency settings on the same media type and even tiers that utilize different media types. With dynamic storage, embodiments could allow multiple read and write caches to be supported, each expressed as a separate tier.

Various resiliency settings can be configured for each tier. Such settings may include: a resiliency setting name (e.g. simple, mirror, or parity); interleave (i.e., the width of the stripes); number of columns; number of data copies; and/or storage device failure tolerance.

Some embodiments implement a generalized and flexible way of supporting multiple read and write caches. One example of multiple write caches is the "waterfall" model where different tiers act as caches for lower tiers. For example, embodiments may implement a write cache on NVDIMM for the SSD tier, and a write cache on SSD for the HDD tier.

Some embodiments implement this by the read or write cache being expressed as its own tier. This cache tier has an attribute to indicate the purpose of the tier.

Users can specify a read cache size when creating a storage entity. In this case, a read cache tier will automatically be created on behalf of the user. Similarly, when specifying the existing write cache size, a write cache tier will automatically be created.

A storage tier class definition could include various parameters related to resiliency. For example, the following illustrates a class definition parameters for storage tiers, where the definition includes resiliency parameters.

One parameter may include a friendly name of the storage tier, defined by the user.

Another parameter may include a definition of the media type of the storage tier. This could be, for example, HDD, SSD, NVDIMM, etc. This may be a closed set, where a user could select an option from the closed set.

Another parameter may include a definition of the maximum size of the tier on the storage entity to limit the storage capacity that that tier can consume.

Another parameter may include a user settable description of the storage tier.

Another parameter may include a field that indicates the number of bytes that will form a strip in common striping-based resiliency settings. The strip is defined as the size of the portion of a stripe that lies on one storage device.

Another parameter may include a field that indicates the number of underlying storage devices across which data for the storage tier is striped.

Another parameter may include a field that indicates how many backing storage devices can fail without compromising data redundancy. For example: RAID 0 cannot tolerate any failures, RAID 5 can tolerate a single drive failure, and RAID 6 can tolerate 2 failures.

Another parameter may include a field that indicates the name of the resiliency setting used on the storage tier.

Another parameter may include a field that indicates how the tier is being used, such as for data or some other specialized use."

Another parameter may include a field that indicates characteristics to describe the media, when media type is unspecified. The media types may be SSD, HDD, NVDIMM, etc. Alternatively, this could be more generalized by specifying media characteristics, such as no-seek penalty.

Another parameter may include a field that indicates whether the tier is part of the LBA range of the storage entity. This attribute, in certain embodiments, cannot be set directly, but is inferred from other attributes such as attributes related to block write cache or file read cache attributes.

Another parameter may include a field that specifies whether the tier should use a block write cache.

The ability to specify the write cache size or for automatically configuring the write cache size is supported in some embodiments. Additionally, some embodiments may support a write cache media type parameter that allows a user to specify which media type the write cache will go on. If this parameter is not specified, then the write cache will go on the fastest tier. Similarly, some embodiments include a read cache size parameter and a read cache media type parameter. In these cases, a cache tier will be created on behalf of the user.

For users that want to experiment with various advanced cache configurations, some embodiments include an option that allows for the user to directly create the cache tiers. This is specified through a usage parameter for the tier. This allows for the write cache to have a different resiliency from the normal tiers and for multiple write caches to be defined. It also allows for the location of the write cache to be specified, such as NVDIMM. If any tier passed to a new storage entity is a write cache tier, then in some such embodiments, specifying the write cache size or automatic write cache size will not be allowed.

Some embodiments include the ability to control which storage tiers are logical block addressable vs. not addressable. Thus, as noted above, some embodiments are implemented where each tier has a usage attribute, which indicates how the tier is to be used. The usage of the tier will determine whether the tier is LBA addressable or not.

Some embodiments may include binding of tier templates. In particular, if any resiliency parameters are not specified to a new storage tier, then the resiliency parameters will be obtained from the storage pool. This binding will occur when the storage entity is created. If the resiliency settings for the storage pool change at a later point, those changes will be reflected when the storage entity is created.

In some embodiments, template tiers are not pre-created by the driver on pool creation, since it is hard to know what resiliency settings the user will want. For example, embodiments have no way of knowing whether templates with two copies or three copies should be created. Therefore, some embodiments defer to the system builder to pre-create templates if desired.

The following now illustrates details of driver design for some embodiments. Since each tier can now have a different column count, either the slab size or the extent size is allowed to be variable. A slab is the minimum unit of allocation in the LBA range of the storage entity that corresponds to a storage tier. The extent is the minimum unit of allocation on an individual storage device. To simplify the management of allocations for file systems and to support the changing of the storage tiers of slabs the slab size, in some embodiments, is kept fixed and the extent size will be variable.

For example, the slab size is calculated as follows:

SlabSize=Data Columns*ExtentSize

To ensure a fixed slab size across tiers, the following will need to be true (where 1 and 2 represent the parameter for each tier):

DataColumns$_1$*ExtentSize$_1$=DataColumns$_2$*ExtentSize$_2$

To ensure a reasonable slab size, additional restrictions can be put in place on the column count for each tier. The following illustrates examples of the limits and targets for each parameter:

Slab Size—Target either 8 GB or 6 GB.
Extent Size—Target around 1 GB. Minimum is 256 MB. Extent size is a multiple of 256 MB.
Data columns—Target 8-16 data columns if there are enough disks.

If the column count is set to "auto", then embodiments will choose column counts that ensure reasonable slab and extent sizes. 8 GB may be preferable for slab size, since it yields extent sizes which are a power of two, which reduces fragmentation. The following table shows the different possibilities for a slab size of 8 GB:

| DataColumns | ExtentSize |
|---|---|
| 1 | 8 GB |
| 2 | 4 GB |
| 4 | 2 GB |
| 8 | 1 GB |
| 16 | 512 MB |
| 32 | 256 MB |

To support additional column counts, a 6 GB slab is supported, which allows for extents that are a multiple of 3 of the minimum extent size. The downside with this is that the extent size may no longer be a power of 2, which could cause increased fragmentation if thin provisioning is supported on tiered spaces. This could be mitigated by allowing a single extent to be split up into non-contiguous 256 MB chunks on disk. The following table shows the different possibilities for a slab size of 6 GB:

| DataColumns | ExtentSize |
|---|---|
| 1 | 6 GB |
| 2 | 3 GB |
| 3 | 2 GB |
| 4 | 1.5 GB |

-continued

| DataColumns | ExtentSize |
|---|---|
| 6 | 1 GB |
| 8 | 768 MB |
| 12 | 512 MB |
| 24 | 256 MB |

The following algorithm is used in some embodiments to determine the column count and slab size when the column count is set to "auto":

1. For each tier, determine the minimum and default column count depending on the resiliency type:
   a. Simple: Minimum=1, Default=8
   b. Mirror: Minimum=1, Default=8
   c. Parity: Minimum=NumberOfGroups*3+FaultTolerance−1, Default=NumberOfGroups*8+FaultTolerance−1
2. For each tier, determine the number of available drives for the particular media type.
3. The starting column count is the smaller of the Default from #1 and the Drives/NumberOfCopies from #2.
4. Starting with the 8 GB slab, determine the sum of the deltas between the column count for each tier computed in #3 and the column count in Table 1 that is less than or equal to the tier column count. Do the same for the 6 GB slab. Choose the slab size that produces the smallest delta, and is therefore a closer match.

The following illustrates an example of implementing the above algorithm.

1. If the SSD tier has 8 drives and the HDD tier has 16 drives, and both are 2-way mirror, then the starting column count will be:
   a. SSD column count=min(8, 8/2)=4
   b. HDD column count=min(8, 16/2)=8
   c. The sum of the delta for the 8 GB is 0 since both appear in the table, so the 8 GB slab is chosen.
2. If the SSD tier has 12 drives and the HDD tier has 16 drives, and both are 2-way mirror, then the starting column count will be:
   a. SSD column count=min(8, 12/2)=6
   b. HDD column count=min(8, 16/2)=8
   c. The sum of the delta for the 8 GB slab=(6−4)+(8−8)=2
   d. The sum of the delta for the 6 GB slab=(6−6)+(8−8)=0
   e. So, the 6 GB slab is chosen, since it has the smallest delta.

If explicit column counts were specified by the user on each tier, then for some embodiments, a check will first be done to see if it is an exact match in either the 8 GB or 6 GB table. If it is, then the matching slab size will be used. If it is not, then a default extent size of 1 GB will be chosen for the tier with the largest column count. The slab size that results from that will be used to determine the extent size for the other tiers. If the resulting extent size for each tier is a multiple of 256 MB, then the space creation can proceed. If not, then the call will fail.

The following illustrates an example:

1. If column counts of 5 and 10 were specified for each tier, then the tier with 10 columns would be assigned a 1 GB extent size, which will produce a 10*1 GB=10 GB slab size. The tier with 5 columns could get an extent size of 10 GB/5=2 GB. Since this is a multiple of 256 MB, this is a valid combination.

2. If column counts of 5 and 7 were specified for each tier, then the tier with 7 columns would be assigned a 1 GB extent size, which will produce a 7*1 GB=7 GB slab size. The tier with 5 columns could get an extent size of 7 GB/5=1.4 GB. Since 1.4 GB is not a multiple of 256 MB, this is an invalid combination.

In alternative embodiments, the slab size can be variable and the extent size is fixed. This avoids fragmentation issues and removes constraints on the column count. However, to simplify the management of allocations for file systems and to support the changing of the storage tier of slabs, embodiments are implemented where the slab size will be kept fixed and the extent size will be variable.

Keeping the slab size fixed, allows the ability for the file system to change the storage tier of a slab. As part of its optimization of data placement (keeping hot data on fast tier and cold data on slower tier), if the file system determines that the requirements for data corresponding to a slab have changed, it can notify the storage entity to change the storage tier of the slab. The storage entity can then change the layout as described in FIGS. 2A-2C. The advantage of this approach is that the LBA address of the data doesn't change from a file system perspective, so file system metadata doesn't need to be updated, which is more efficient.

In summary, data with different requirements may be co-located within a single storage entity. The layout of the storage entity is composite (hence storage tiers) in order to accommodate that. In other words, a storage entity can be associated with multiple storage tiers. Each storage tier defines a layout that accommodates a set of resiliency and performance requirements. Each storage tier is bound to one or more LBA ranges of the storage entity; data with requirements that match those accommodated by a storage tier that resides within the corresponding LBA ranges.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
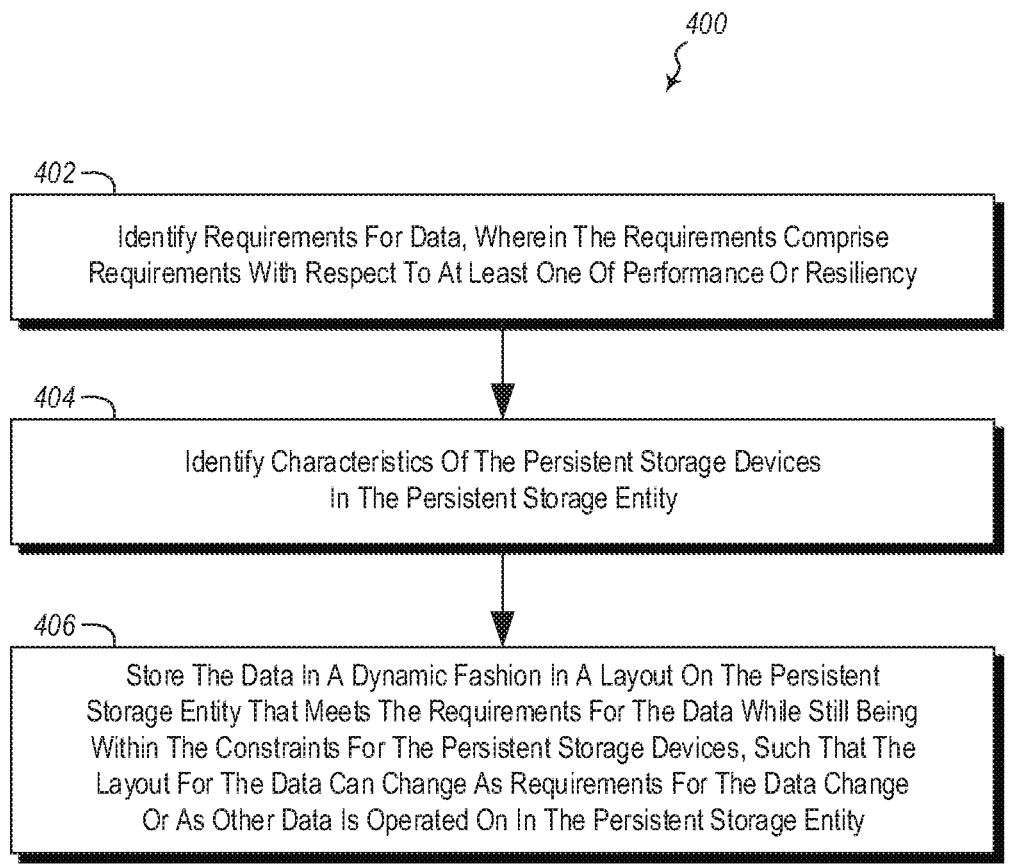
FIG. 4 illustrates a method of storing data in a dynamic fashion.

Referring now to FIG. 4, a method 400 is illustrated. The method 400 may be practiced in a computing environment. The method 400 includes acts for storing data in a dynamic fashion where data is stored on a live persistent storage entity (e.g. storage entity 102). The entity is comprised of portions of a plurality of different persistent storage devices, each having certain storage constraints. For example, such characteristic may include one or more of capacity, media type, speed, external cache, data density, etc. The data is stored at the entity in a manner that meets requirements for the data. For example, the data may have certain performance and/or resiliency requirements. The method 400 includes identify requirements for data, wherein the requirements comprise requirements with respect to at least one of performance or resiliency (act 402).

The method 400 further includes identifying constraints of the persistent storage devices in the persistent storage entity (act 404).

The method 400 further includes storing the data in a dynamic fashion in a layout on the persistent storage entity that meets the requirements for the data while still being within the constraints for the persistent storage devices, such that the layout for the data can change as requirements for the data change or as other data is operated on in the persistent storage entity (act 406).

The method 400 may further include changing the layout for the data in the persistent storage entity by converting the data from mirrored data to parity data. Alternatively or additionally, the method 400 may further include changing the layout for the data in the persistent storage entity by converting the data from striped mirrored data to non-striped mirrored data. Alternatively or additionally, the method 400 may include changing the striping width of striped data. Alternatively or additionally, the method 400 may further include changing the layout for the data in the persistent storage entity by transferring the data from a persistent storage device of a first type to a persistent storage device of a second type. For example, embodiments may transfer data from SSD to HDD. This will actually result in a change to the storage capacity of the persistent storage entity. Thus, embodiments maybe implemented where the storage entity actually changes its capacity over time. Alternatively or additionally, the method 400 may further include changing the layout for the data in the persistent storage entity by converting the data from a device that is resilient to a first number of device failures to a second different number device failures. For example, data may be converted from single parity to dual parity, or from a 3 way mirror to a 2 way mirror, etc.

As noted above, embodiments may be implemented where changing the layout results in a change to the capacity of the persistent storage entity. Embodiments may be implemented where changing the layout results in a change to the performance of data access of the data. Embodiments may be implemented where changing the layout results in a change to the resiliency of the data.

The method 400 may be practiced where the data requirements are based on one or more of access patterns for the data (e.g. is the data hot or cold?), application creating or using the data (e.g. data for an internet browser can be less redundant than data for a finance application or a quality assurance application), user role of individual accessing data (e.g. data for the CEO may be required to be more performant and more redundant than data that is only used by mail room employees), service level agreement, department of a company producing or using the data, time of day the data, network characteristics, protocols of data, etc.

The method 400 may be practiced where identifying constraints of the persistent storage devices in the persistent storage entity, comprises identifying one or more of device capacity, drive type, speed, etc.

Embodiments may include functionality for rearranging data within the storage entity to accommodate incoming or other data. For example, in some embodiments, as other data comes into the storage entity, embodiments may determine that no capacity is available to meet requirements for the data. Embodiments can then identify data that can have its layout changed and still be within the requirements for the data to create capacity for the other data. This may be done, for example, by evicting and moving data from one type of storage to another type of storage to repurpose existing capacity. For example, it may be determined that data can be moved from SSD storage to HDD storage to create additional space on the SSD storage. Alternatively, embodiments may change a layout to change the available capacity of a persistent storage entity. For example, changing the layout from a mirrored layout to a parity layout will actually increase the size of the storage entity and create additional space for data storage.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A persistent storage entity comprising:
   a plurality of storage tiers, at least one storage tier comprising a first type of persistent storage device and at least one other storage tier comprising a second type of persistent storage device;
   one or more computer-readable media storing computer-executable instructions;
   one or more processors which, when executing the computer-executable instructions, cause the persistent storage entity to dynamically change a layout configuration for data stored at storage tiers of the persistent storage entity, and wherein dynamically changing the layout configuration comprises:
      receiving a request to store data;
      identifying requirements for storing the received data, wherein the requirements comprise at least one of performance relating to how quickly the data is required to be accessed, or resiliency relating to maintaining availability within a specified statistical figure of the data in the event of a hardware failure at the persistent storage entity;
      in accordance with either or both of the performance and resilience requirements identified for the received data, changing an initial data layout of the at least one storage tier, wherein changing the initial data layout does not disturb performance or resilience requirements of data already stored in the initial data layout; and
      using the changed data layout of the at least one storage tier, storing the data at the at least one storage tier.

2. The system of claim 1, wherein the first type of persistent storage device comprises one or more hard disk drives (HDDs), and wherein the second type of persistent storage device comprises one or more solid state drives (SSDs).

3. The system of claim 1, wherein the persistent storage entity dynamically changes the initial data layout while the persistent storage entity is storing and providing data.

4. The system of claim 1, wherein the persistent storage entity dynamically changes the initial data layout from simple to mirrored storage by copying existing data from one persistent storage device to another persistent storage device while the persistent storage entity is storing and providing data from the first persistent storage device.

5. The system of claim 1, wherein the persistent storage entity dynamically changes the initial data layout from simple to striped storage by copying at least a portion of existing data from one persistent storage device to another persistent storage device while the persistent storage entity is storing and providing data from the first persistent storage device.

6. The system of claim 1, wherein the persistent storage entity dynamically changes the initial data layout from simple to parity storage by copying at least a portion of existing data from one persistent storage device to another persistent storage device while the persistent storage entity is storing and providing data from the first persistent storage device.

7. The system of claim 1, wherein the persistent storage entity dynamically changes the capacity of the storage entity while the persistent storage entity is storing and providing data.

8. The system of claim 1, wherein the persistent storage entity dynamically changes the resiliency of at least a portion of data stored at the persistent storage entity while the persistent storage entity is storing and providing data.

9. The system of claim 1, wherein the persistent storage entity dynamically changes the performance of at least a portion of data stored at the persistent storage entity while the persistent storage entity is storing and providing data.

10. A computer-implemented method of changing a layout configuration for data stored at storage tiers of a persistent storage entity to allow for changing requirements regarding performance or resiliency of data, the computer-implemented method being performed by one or more processors executing computer executable instructions for the computer-implemented method, and the computer-implemented method comprising:

receiving at a persistent storage entity a request to store data;

identifying requirements for storing the received data, wherein the requirements comprise at least one of performance relating to how quickly the data is required to be accessed, or resiliency relating to maintaining availability within a specified statistical figure of the data in the event of a hardware failure at the persistent storage entity;

in accordance with either or both of the performance and resilience requirements identified for the received data, changing an initial data layout of the at least one storage tier, wherein changing the initial data layout does not disturb performance or resilience requirements of data already stored in the initial data layout; and using the changed data layout of the at least one storage tier, storing the data at the at least one storage tier.

11. The method of claim 10, wherein dynamically changing the initial data layout for the data in the persistent storage entity comprises dynamically changing the initial data layout by converting the data from mirror to parity.

12. The method of claim 10, wherein changing the initial data layout for the data in the persistent storage entity comprises dynamically changing the initial data layout by converting the data from striped mirror to non-striped mirror.

13. The method of claim 10, wherein changing the initial data layout for the data in the persistent storage entity comprises dynamically changing the initial data layout by transferring the data from the persistent storage device of the first type to the persistent storage device of the second type.

14. The method of claim 10, wherein changing the initial data layout for the data in the persistent storage entity comprises dynamically changing the initial data layout by converting the data from a device that is resilient to a first number of device failures to a second different number of device failures.

15. The method of claim 10, wherein changing the initial data layout results in a dynamic change to the capacity of the persistent storage entity.

16. The method of claim 10, wherein changing the initial data layout results in a dynamic change to the performance of data access of the data.

17. The method of claim 10, wherein changing the initial data layout results in a dynamic change to the resiliency of the data.

18. The method of claim 10, wherein the identified requirements for the received data are based on one or more of access patterns, an application operating on or creating data, user role of a user creating or operating on data, service agreement levels, enterprise department generating or operating on data, time of day, network characteristics, or protocols of data.

19. The method of claim 10, wherein identifying constraints of the persistent storage devices in the persistent storage entity, comprises identifying one or more of capacity, drive type, or drive speed.

20. A computer-implemented method of dynamically changing a layout configuration for data stored at a persistent storage entity to allow for changing requirements regarding performance or resiliency of data that is stored over time, the computer-implemented method being performed by one or more processors executing computer executable instructions for the computer-implemented method, and the computer-implemented method computer-implemented method comprising:

receiving at a persistent storage entity a request to store data, wherein the persistent storage entity has at least one storage tier comprising at least a first type of persistent storage device;

identifying requirements for storing the received data, wherein the requirements comprise at least one of performance relating to how quickly the data is required to be accessed, or resiliency relating to maintaining availability within a specified statistical figure of the data in the event of a hardware failure at the persistent storage entity;

identifying an initial data layout used at the at least one storage tier of the persistent storage entity, including identifying constraints of the at least first type of persistent storage device;

in accordance with either or both of the performance and resilience requirements identified for the received data, dynamically changing the initial data layout of the at least one storage tier while the persistent storage entity is storing and providing data, and wherein the dynamic change does not alter the identified constraints for the at least first type of persistent storage device so that performance or resilience requirements of data already stored in the initial data layout is undisturbed; and using the changed data layout of the at least one storage tier, storing the data at the at least one storage tier.

21. The computer-implemented method of claim 20, wherein the at least first type of persistent storage device is used for different layout schemes.

* * * * *